United States Patent [19]

Hayashi et al.

[11] Patent Number: 4,469,817
[45] Date of Patent: Sep. 4, 1984

[54] METHOD FOR RECLAMATION OF VULCANIZED RUBBER

[75] Inventors: Keizo Hayashi, Nagoya; Atsushi Sumida, Inazawa; Teruo Murayama, Niiza; Tomio Minobe, Fuzimi, all of Japan

[73] Assignees: Toyoda Gosei Co., Ltd., Haruhimura; Micro Denshi Co., Ltd., Niiza, both of Japan

[21] Appl. No.: 442,668

[22] Filed: Nov. 18, 1982

[30] Foreign Application Priority Data

Nov. 19, 1981 [JP] Japan .................... 56-186046

[51] Int. Cl.³ .............................................. C08J 11/00
[52] U.S. Cl. ........................................ 521/45; 521/41; 521/45.5
[58] Field of Search ............... 260/710, 720; 521/45.5, 521/41, 45

[56] References Cited

U.S. PATENT DOCUMENTS

| | | | |
|---|---|---|---|
| 2,645,817 | 7/1953 | Brown et al. | 260/710 |
| 2,804,651 | 9/1957 | Peterson | 260/710 |
| 4,104,205 | 8/1978 | Novothy et al. | 521/45.5 |
| 4,146,508 | 3/1979 | Maxwell | 521/45.5 |

Primary Examiner—Allan Lieberman
Attorney, Agent, or Firm—Cushman, Darby & Cushman

[57] ABSTRACT

Reclamation of vulcanized rubber is effected by a method which comprises heating powdered vulcanized rubber to a temperature for desulfurization of the rubber and, on completion of the desulfurization, quickly cooling the desulfurized rubber to a temperature at which substantially no oxidation of desulfurized rubber proceeds. This method obviates otherwise indispensable incorporation of process oil or other similar additive to the powdered vulcanized rubber for the purpose of retarding the oxidation of rubber molecules. When the reclaimed rubber obtained by this method is blended with newly supplied rubber, the resultant vulcanized rubber shows sparing degradation of physical properties.

3 Claims, 6 Drawing Figures

METHOD FOR RECLAMATION OF VULCANIZED RUBBER

BACKGROUND OF THE INVENTION

This invention relates to a method for the reclamation of vulcanized rubber for the purpose of reuse, and more particularly to a method for producing highly useful reclaimed rubber on a commercial scale by highly efficient desulfurization of powdered scrap vulcanized rubber by the use of microwave energy. This invention, therefore, realizes improvement in the quality of reclaimed rubber.

As measures for attaining reuse of scrap vulcanized rubber, a method which finely pulverizes scrap vulcanized rubber and utilizes the resultant vulcanized rubber powder as a filler for unvulcanized rubber, a method which combines scrap vulcanized rubber with a regenerating agent and heats the resultant mixture so as to desulfurize and convert the mixture into reclaimed rubber, and a method which effects reclamation of rubber by a simple procedure of desulfurizing scrap vulcanized rubber at elevated temperatures through the agency of microwave, for example, have been heretofore known to the art.

When the scrap vulcanized rubber is finely pulverized to be used as a filler, however, the cost of the pulverization is high and the produced filler often finds only limited end uses. The method which effects reclamation by use of a regenerating agent entails a problem that the regenerating agent to be used therein goes to increasing the cost of reclamation and imparting to the reclaimed rubber pollutional, toxic, and odorous components. In the case of the method which provides simplified reclamation by the use of microwave, even after the desulfurization by heating is completed, the heat accumulated during the desulfurization causes the thermal decomposition of desulfurized rubber to proceed further and the consequent oxidation (exothermic reaction) of rubber molecules to induce fracture of main chains and thermal decomposition and carbonization of rubber and additional components. When the reclaimed rubber obtained by this method is blended with freshly supplied rubber, the pulverized rubber obtained from the resultant mixture suffers from heavy degradation of properties and often finds greatly restricted end uses.

Figure 1:
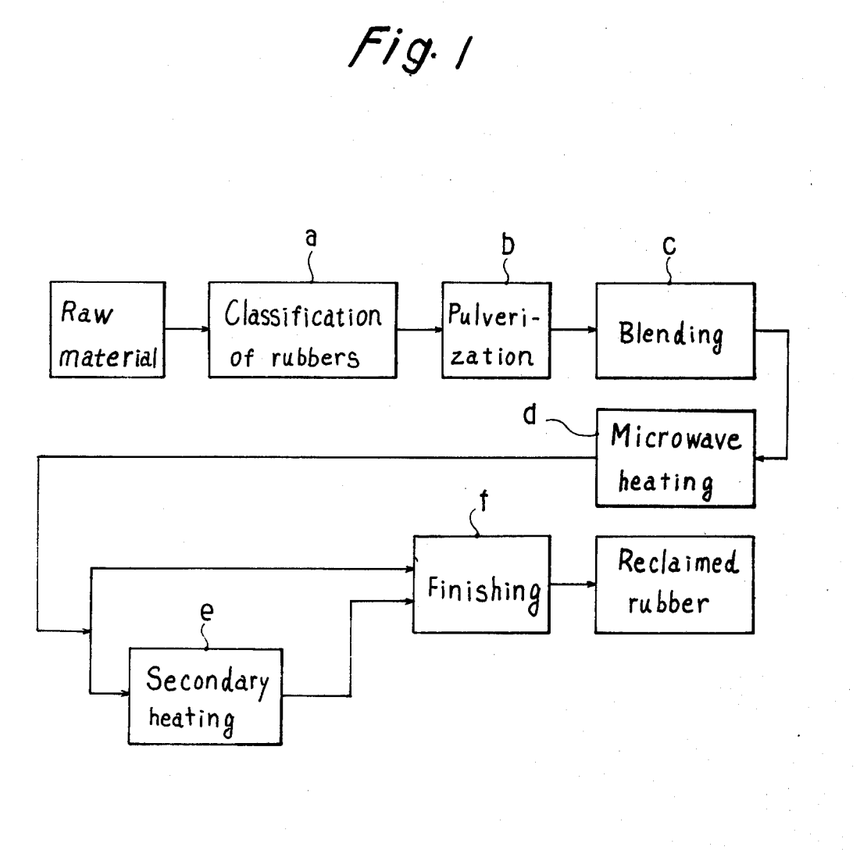
FIG. 1 is a block diagram illustrating a conventional method for the reclamation of vulcanized rubber by means of microwave.

There has been proposed, in Japanese Utility Model Application No. Sho 54(1979)-126761 (Unexamined Utility Model Publication Sho No. 56(1981)-44117) filed by the same applicant as the present patent application, a method for the vulcanization of reclaimed rubber as illustrated in the block diagram of FIG. 1.

This method, which comprises a step (a) for classifying scrap vulcanized rubbers by kind, a step (b) for pulverizing the separated vulcanized rubber into powder, a step (d) for desulfurizing the vulcanized rubber powder at elevated temperatures within a microwave heating chamber, etc., is characterized by interposing between the step (b) and the step (d) a step (c) for admixing the pulverized vulcanized rubber with a rubber process oil. Owing to the incorporation of the rubber process oil, the contact of rubber process oil, the contact of rubber molecules with oxygen is obstructed so much as to retard the aforementioned oxidation of rubber molecules. Even by this method, when the volume of scrap vulcanized rubber to be treated is large, the interior of rubber mass under treatment does not easily liberate heat thoroughly between the time the treatment is completed in the step (d) for microwave heating or a step (e) for secondary heating and the time the finishing treatment by rolling is started in a step (g) for finishing. Owing to the heat generated by the oxidation which is consequently suffered to proceed though gradually, the mass of rubber under treatment remains in an overheated state and, thus, tends to induce fracture of rubber molecules, decomposition of additional components (including rubber process oil), and carbonization of rubber and additional components. In this respect, the present method has not offered a perfect solution to the aforementioned problem. The step (e) for secondary heating is intended for improving the overall efficiency of heating by this method and is not always indispensable.

SUMMARY OF THE INVENTION

The method which reclaims vulcanized rubber by heating as contemplated by the present invention is characterized by heating the vulcanized rubber to a temperature for desulfurization thereby effecting desulfurization of vulcanized rubber and, after completion of the desulfurization, rapidly cooling the resultant desulfurized rubber to a temperature at which virtually no oxidation is allowed to proceed. Owing to this characteristic, the method of this invention not only obviates the necessity for incorporating additional components such as the process oil useful for retarding the oxidation of rubber molecules but also ensures manufacture of reclaimed rubber which, on being blended with newly supplied rubber and vulcanized, gives rise to vulcanized rubber suffering from only slight degradation of properties and, therefore, finding a wide range of uses.

Further, the method of this invention is characterized by the fact that the aforementioned heating of vulcanized rubber is effected by means of microwave heating. Owing to this characteristic, the elevation of the temperature of the vulcanized rubber to the desulfurization temperature can be effected uniformly and quickly and the desulfurization can be completed in a short time.

Moreover, the method of this invention is characterized by the fact that the aforementioned cooling of the desulfurized rubber is accomplished by the addition of water. Owing to this characteristic, the cooling of the desulfurized rubber to the temperature at which substantially no oxidation of desulfurized rubber proceeds can be obtained uniformly and quickly. This cooling calls for no special cost and, therefore, proves advantageous from the economic point of view.

DESCRIPTION OF THE PREFERRED EMBODIMENT

Figure 2:
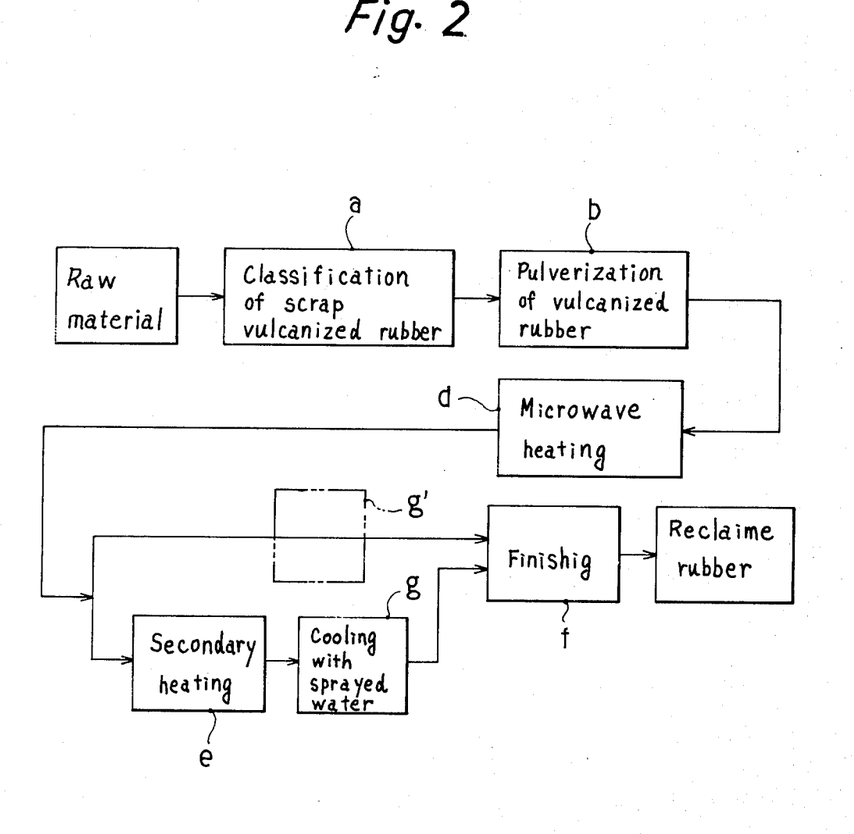
FIG. 2 is a block diagram illustrating the method of this invention for the reclamation of vulcanized rubber by means of microwave.

FIG. 2 is a block diagram illustrating the steps of operation involved in the present invention. The steps corresponding to the steps of the conventional method of FIG. 1 are denoted by like symbols. In the case of the present invention, the step for heating vulcanized rubber can be effected by using microwave, electric heater, pressurized steam, etc. may be used either independently or in combination. Among other means of heating, the microwave heating proves particularly advantageous because it permits the vulcanized rubber to be heated uniformly and quickly throughout the entire volume thereof. Subsequently to the step of microwave heating, the present invention incorporates a step (g) or (g') for cooling the heated vulcanized rubber such as by the addition of water. When the rubber which has undergone the step (d) for microwave heating is desired to be maintained in its heated state subsequently in a step (e) for secondary heating, the rubber is cooled by being sprayed with water in the step (g) for cooling after it has been kept in the heated state in the step (e) for secondary heating. When the rubber is not desired to be maintained at its heated state in the step (e) for secondary heating, the rubber which has been heated in the step (d) for microwave heating is directly subjected to the cooling in the step (g') for cooling. In the step (e) for secondary heating, the retention of the rubber at its heated state is accomplished either by using microwave, electric heater, pressurized steam, etc. independently or in combination or by insulating the hot rubber from the ambient air. In the step (g) for cooling, the cooling is effected quickly by the heat of evaporation of such an inert liquid as water, Freon, or liquefied carbon dioxide or by the conduction of heat due to circulation of a refrigerant.

In the step (d) for microwave heating, the vulcanized rubber under treatment is heated to a temperature in the range of about 180° C. to 350° C., though variable with the particular kind of rubber. By this heating, the vulcanized rubber is heated to a temperature which is necessary for the depolymerization (desulfurization) thereof. While the heated rubber is thereafter retained at its heated state in the subsequent step for secondary heating, the bonds of carbon-sulfur and sulfur-carbon are severed to effect desulfurization and part of the polymeric molecules are also severed. After the heating by microwave and the treatment of secondary heating, the heat built up in the rubber treated as described above generally causes the rubber to undergo further oxidation and radiate heat owing to the oxidation. In the case of the present invention, since the rubber which has been desulfurized by these heating treatment is quickly cooled such as with water, the fracture of main chains of rubber molecules the thermal decomposition of additional components, and the carbonization of rubber and additional components hardly proceed. When the reclaimed rubber obtained by this invention is blended with newly supplied rubber, therefore, the resultant vulcanized rubber is prevented from otherwise possible degradation of properties. The cooling of the heated rubber is desired to be effected as quickly as possible. The cooling speed must be at least 10° C./min. (preferably 90° C./min.). When the cooling speed is less than 10° C./min., the colling time increases so much that the oxidation of the rudder proceeds during the course of cooling and prevents the object of this invention from being attained. As means of cooling, addition of water proves advantageous in terms of speed and uniformity of cooling, ease of work, freedom from odor, and cost of equipment. The amount of the water so added is required only to be enough for the purpose of lowering the temperature of the heated rubber to a level at which the oxidation of rubber hardly proceeds, on the condition that the water used in that amount should cause no change in the weight of rubber in the product. The oxidation of rubber molecules fails to proceed further after the temperature of rubber has fallen to a level in the range of about 150° C. to 200° C., though variable with the particular kind of rubber under treatment. So far as the temperature of rubber after the cooling by the addition of water exceeds about 100° C., any water entrapped in the rubber is wholly vaporized into steam and easily expelled out of the rubber. Thus, no water is suffered to cause any change in the weight of rubber in the final product. This means that the amount of water to be added for cooling should be such that the cooling will not lower the temperature of the heated rubber to a level appreciably below 100° C. When the cooling water is added in such a large amount as to lower the temperature of the heated rubber to a level appreciably below 100° C., part of the added water remains unvaporized in the rubber. When this rubber is subsequently vulcanized to manufacture vulcanized rubber, the remaining water causes foaming of the rubber and exerts adverse effects on the quality of produced rubber. Thus, the amount of water used for the cooling should be decreased to the lowermost possible degree at which no water is suffered to remain in the cooled rubber, namely no water is suffered to remain and cause a change in the weight of produced rubber. The amount of water added, nevertheless, must be ample enough for cooling the heated rubber to a temperature in the neighborhood of 150° C. to 200° C. at which substantially no oxidation of rubber molecules proceeds, on the condition that no part of the cooling water should go to causing any change in the weight of produced rubber.

The amount of water (A) which satisfies the condition mentioned above can be calculated by the following formula;

$$A = \frac{W_R \cdot C_r(T_1 - T_2)}{C_w(100 - \theta) + l}$$

wherein, $W_R$ denotes the amount of vulcanized rubber under treatment, $C_r$ the specific heat of vulcanized rubber (0.35 cal.g$^{-1}$.°C$^{-1}$), $T_1$ the temperature to be reached by heating, $T_2$ the temperature to be reached by cooling, $C_w$ the specific heat of water (1 cal.g$^{-1}$.°C$^{-1}$), $\theta$ the temperature of cooling water, and $l$ the heat of vaporization of water (539 cal.g$^{-1}$).

Under the conditions of $W_R$=10 kg, $T_1$=350° C., $T_2$=200° C., and $\theta$=20° C., for example, the amount of water (A) is found as follows.

$$A = \frac{10 \times 10^3 \times 0.35 \times (350 - 200)}{1 \times (100 - 20) + 539} = 850 \text{ (g)}$$

This verbally signifies that about 0.85 liter of water is required to cool 10 kg of powdered vulcanized rubber at 350° C. to 200° C.

Figure 3:
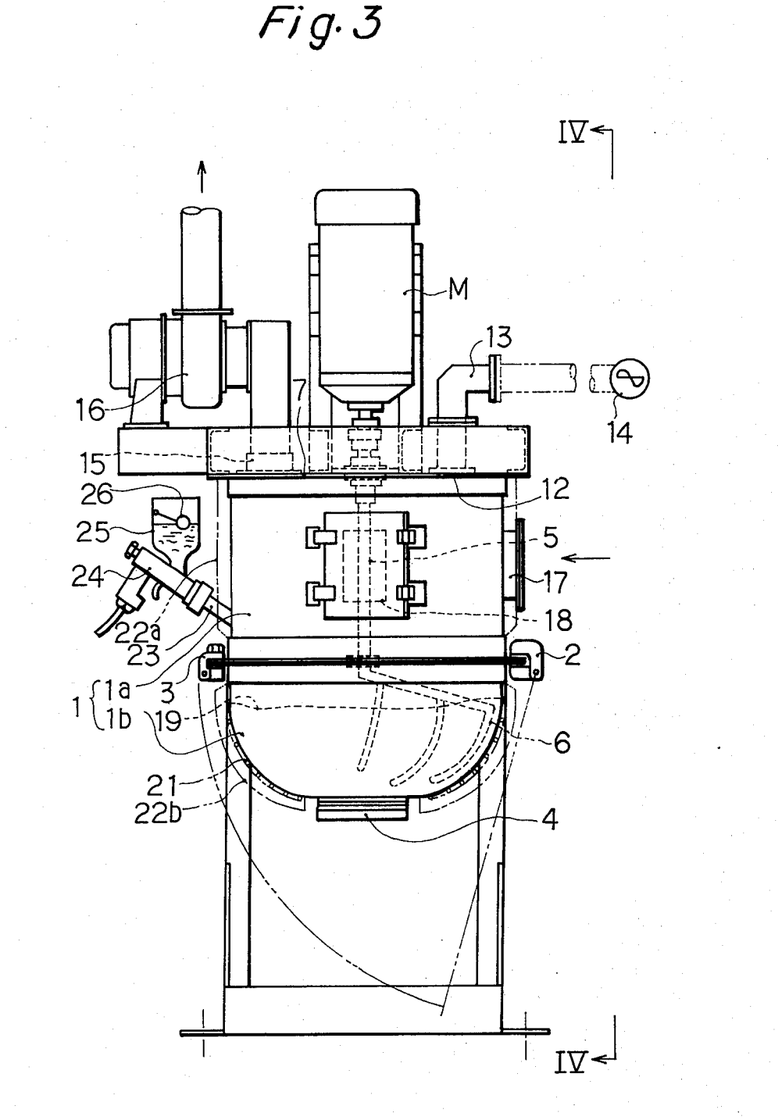
FIG. 3 is a front view of a typical apparatus to be used for working the method of this invention for the reclamation of vulcanized rubber.
Figure 4:
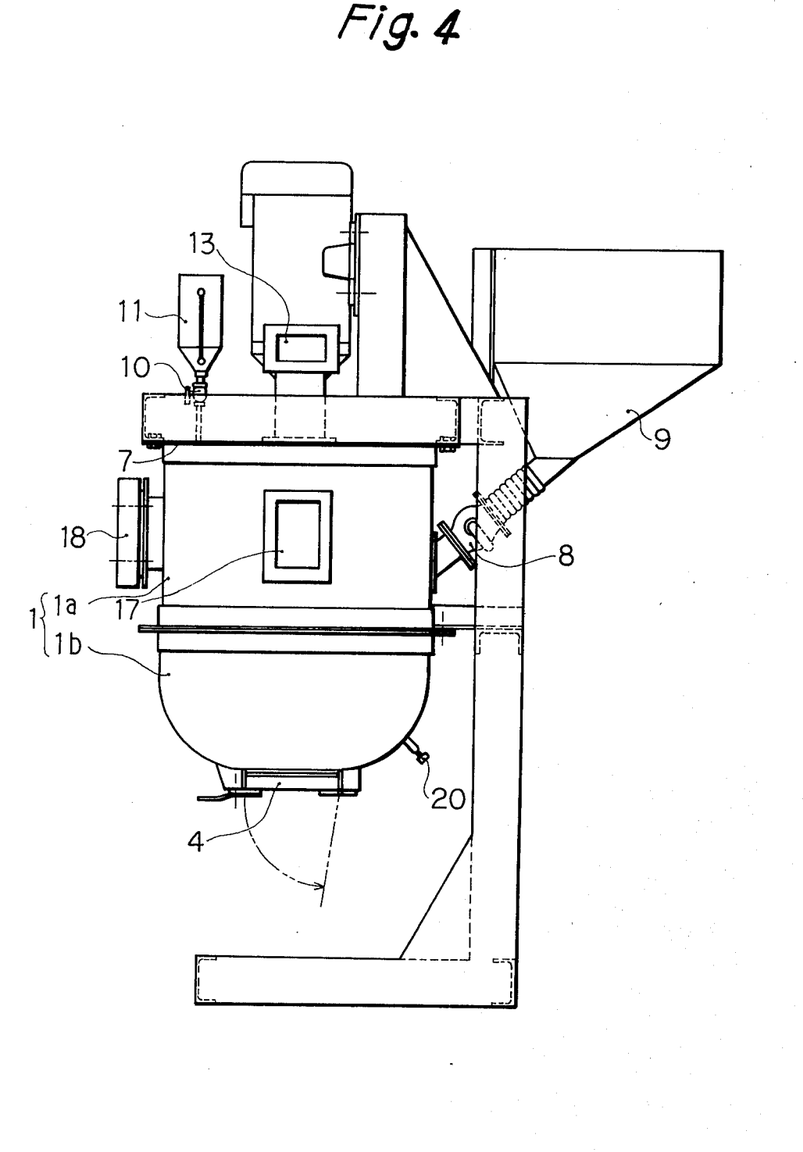
FIG. 4 is a cross section taken along the line IV—IV in the diagram of FIG. 3.

Now, a typical apparatus to be used for reclaiming powdered vulcanized rubber by cooling with water as contemplated by the present invention will be described below. FIG. 3 is a front view illustrating the appearance of the apparatus for reclamation and FIG. 4 is a right-hand side view of the same apparatus. 1 is denoted a microwave heating chamber which is formed of a tubular barrel 1a encircling a space for heating and a mixing tank 1b underlying the barrel 1a. To facilitate maintenance and inspection of the interior of the chamber 1, the mixing tank 1b is adapted to be opened from and closed to the barrel 1a with a hinge 2 as the fulcrum. Normally, the mixing tank 1b is tightly closed to the barrel 1a with a clamp 3. For the sake of the efficiency of agitation, the mixing tank 1b is formed in the shape of a hemisphere or bowl. The mixing tank 1b is provided at the bottom portion thereof with a door 4, which remains closed while vulcanized rubber is undergoing treatment. On completion of this treatment, this door 4 is opened to the position indicated by the chain line in FIG. 4 to permit withdrawal of reclaimed rubber. Inside the mixing tank 1b are contained stirring blades 6 attached to a rotary shaft 5. The rotary shaft 5 is connected at the upper end thereof to the shaft of a motor M mounted on a ceiling plate 7 of the barrel.

To the lateral wall of the barrel 1a, a hopper 9 for feeding rubber as raw material is connected via a ball valve 8 as illustrated in FIGS. 4. To the ceiling plate 7 which tightly closes the upper end of the barrel 1a, a liquid tank 11 is connected via a valve 10. This liquid tank 11 serves to store additives such as process oil. To a power supply port 12 which opens in the ceiling plate 7, a microwave generator 14 is connected via a wave guide tube 13. To a gas outlet tube 15 which also opens in the ceiling plate 7, a fan 16 is connected. The vapor and other gases produced within the heating chamber 1 are discharged by the fan 16 through the tube 15.

In the lateral wall of the barrel 1a opens an air inlet 17. Optionally a hot air generator such as an electric heater may be connected to the air inlet 17 so as to supply hot air into the heating chamber 1. The lateral wall of the barrel is further provided with an inspection window 18 to permit inspection of the interior of the barrel. Normally, this is kept closed with a door.

To permit supply of cooling water to the interior of the mixing tank 1b according to the method of the present invention, a water feed tube 23 is connected to the lateral wall of the barrel 1a. To the water feed tube 23, a water tank 25 is connected via a spray gun 24. The water tank 25 is provided therein with a float switch actuated by a float 26. It is also provided with a water feed solenoid valve regulated by the float switch. When the supply of water in the water tank 25 falls short, the float switch opens the solenoid valve to introduce water into the water tank 25 such as through a service water pipe. As the water in the water tank rises to a prescribed level, the float switch closes the solenoid valve. Thus, the water tank 25 stores the optimum amount of cooling water calculated by the aforementioned formula. When the spray gun 24 is operated, the whole amount of water stored in the water tank 25 is fed into the mixing tank 1b. The spray gun 24 may be adapted to be operated manually or automatically.

Now, the operation of this apparatus for the reclamation of vulcanized rubber in accordance with the method of this invention and the corresponding response of the apparatus will be described below. In the hopper 9, powdered vulcanized rubber (particle diameter by the Tyler scale 5 to 15 mesh) is placed to capacity in advance. By regulated opening of the valve 8, a required amount of powdered vulcanized rubber is allowed to fall gravitationally into the bowl-shaped mixing tank 1b of the microwave heating chamber until the heap of vulcanized rubber reaches the level indicated by the chain line 19.

Then, the microwave generator 14 is actuated. The microwave energy consequently generated is forwarded via the wave guide tube 13 and released through the power supply port 12 into the microwave heating chamber 1 to effect the step (e) for microwave heating of the powdered vulcanized rubber 19. In this while, the motor M keeps the stirring blades 6 in rotation to stir the powdered vulcanized rubber being heated by microwave. The revolution number of the stirring blades 6 is regulated to suit best the purpose of uniformly heating the powdered vulcanized rubber 19.

By simultaneously undergoing stirring and microwave heating as described above, the powdered vulcanized rubber 19 is heated to the prescribed temperature (180° C. to 350° C.) at which depolymerization (or partial depolymerization) being to occur on the vulcanized rubber. This temperature can be freely set by means of a temperature sensor 20 disposed round the lowermost lateral side of the mixing tank 1b; the sensor serving to keep detecting the temperature of the powdered vulcanized rubber 19 and automatically controlling the operating time (heating time) of the microwave generator 14. When the rubber which has undergone the microwave heating is desired to be treated for secondary heating, supply of hot air via the air inelt 17 and discharge of spent air by the air discharge fan 16 are continued for a prescribed length of time after the stop of the supply of microwave. During this period, the rubber is kept at the temperature of secondary heating.

In this manner, reclamation of the vulcanized rubber by uniform heating is effected. When the wall of the mixing tank 1b to which the powdered vulcanized rubber comes into contact is provided on the outside thereof with a heater 21 or supplied with a heat medium such as steam or hot oil and, at the same time, provided with a heat insulator layer 22b and the barrel 1a is also provided on the outer wall thereof with a heat insulator layer 22a, the rubber under treatment within the mixing tank is effectively prevented from cooling, with the inflow of hot air through the air inlet 17 as a contributory factor. As the result, the uniform heating is carried out all the more smoothly. As the air discharge fan 16 is operated to withdraw the spent air simultaneously with the supply of hot air, the gas emanating from the powdered vulcanized rubber is safely discharged before it has time to lower the temperature of the rubber under treatment.

When the desulfurization of the vulcanized rubber by this uniform heating is completed, the operation is shifted to the step (g) or (g') for cooling in the diagram of FIG. 2. The spray gun 24 is actuated to start the supply of cooling water from the water feed pipe 23 into the microwave heating chamber 1 and sprayed onto the desulfurized rubber held inside the mixing tank 1b. Again in this case, the stirring blades 6 are revolved to stir the desulfurized rubber which is kept sprayed with the cooling water from the spray gun 24, with the result that the rubber is uniformly and quickly cooled.

After the rubber has been cooled to a temperature of about 100° C. to 200° C., the door 4 at the outlet is opened to discharge the rubber. When the stirring blades are kept in revolution during the discharge of the rubber, the portion of rubber adhering to the wall of the mixing tank can be easily removed completely. The discharged rubber is subsequently finished with a roll to afford reclaimed rubber.

Now, the effect of the present invention will be demonstrated below with reference to working examples of this invention in contract to a comparative experiment of the conventional method.

The method of the present invention and the conventional method were worked under the varying conditions indicated in Table 1 to produce reclaimed rubber of varying properties similarly shown in Table 1.

In each of the experiments, about 10 kg of vulcanized rubber, EPDM (ethylene-propylene-diene terpolymer). The formulation of the vulcanized rubber was similar to that of new rubber as shown below.

|  | (parts by weight) |
|---|---|
| EPDM (made by Mitui Petrochemical Co., Ltd. and marketed under trademark designation of Mitsui EPT 4045) | 100 |
| Zinc oxide | 5 |
| Stearing acid | 1 |
| FEF black | 60 |
| Sulfur | 1.5 |
| Vulcanization accelerator TS | 1.5 |
| Vulcanization accelerator M | 0.5 |
| Process oil | 20 |

The microwave generator used for microwave heating was rated for 5 KW of output and 2450 MHz of frequency and the electric furnace had inside dimensions of 50×50×50 mm and a heater output of 1.5 KW. The heating time was 15 minutes during the heating by microwave and 30 minutes during the heating by the electric furnace. The temperature after cooling indicated in the table was the temperature to be reached by forced cooling. After reaching this temperature, the rubber was allowed to cool off spontaneously to room temperature.

The reclaimed rubber thus obtained in each working example (or comparative experiment) was blended with newly supplied rubber composition in connection with accelerators and sulfur in the indicated proportions. The resultant blend was press molded under the conditions of 300 kg/cm$^2$ × 160° C. × 15 minutes to produce a shaped vulcanized rubber. The shaped vulcanized rubber was tested for the physical properties indicated below in accordance with Japanese Industrial Standards, K-6301.

(1) Hardness—A spring type hardness tester, Type C (with measurement made at five points of the test piece).
(2) Tensile strength and elongation—A test piece of dumbell type 3 in a Shopper type tester (four test pieces each for a sample).
(3) Compression set—A test piece was tested after 22 hours' heating at 70±1° C. (three test pieces each for a sample).

Figure 5:
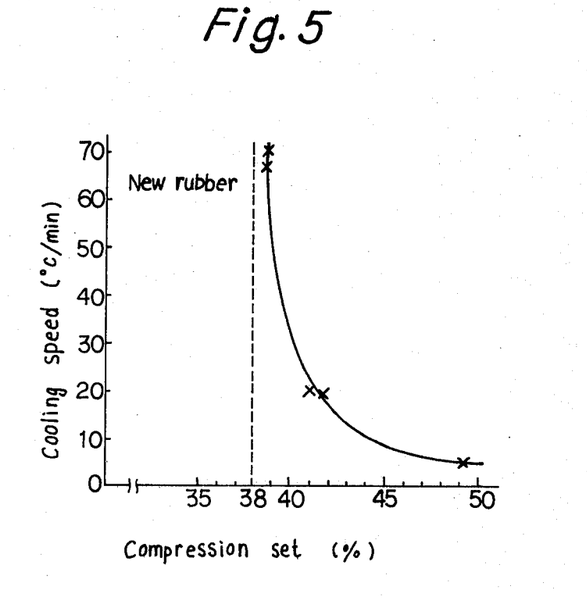
FIG. 5 is a graph illustrating the relation between the cooling speed and the compression set.
Figure 6:
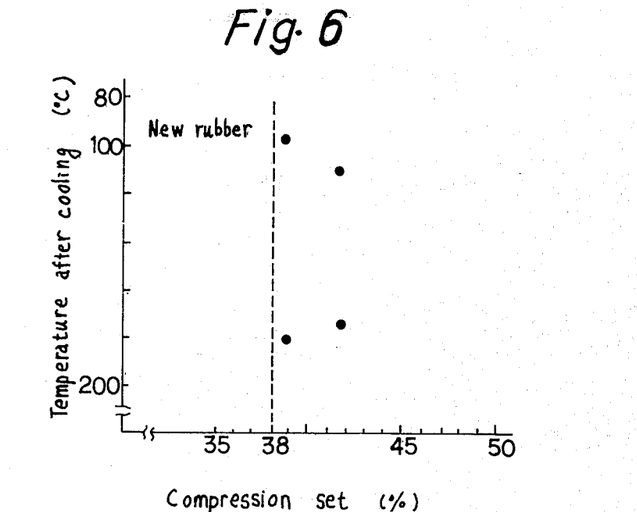
FIG. 6 is a graph showing the relation between the temperature after cooling and the compression set.

The results are shown in Table 1. From these test results, it is noted that the shaped vulcanized rubbers incorporating the reclaimed rubbers of the working examples excelled the shaped vulcanized rubber incorporating the reclaimed rubber of the comparative experiment in terms of tensile strength and compression set. As compared with the shaped vulcanized rubber from newly supplied rubber, they showed sparing degradation in such physical properties. In Examples 1-4 which involved cooling with water after the microwave heating, it is noted that the coefficients of compression set were smaller and the magnitudes of tensile strength were higher in Examples 1, 3 involving a higher speed of cooling (70° C./min.) than in Examples 2, 4 involving a lower speed of cooling (20° C./min.) (see FIG. 5). It is further noted that when the temperature after cooling fell within the range of 100° C. to 200° C., no correlation existed between the temperature after cooling and the coefficient of compression set (see FIG. 6).

TABLE 1

| | Comparative Experiment | Example 1 | Example 2 | Example 3 | Example 4 | Example 5 | Example 6 | Example 7 | New rubber |
|---|---|---|---|---|---|---|---|---|---|
| (conditions for production of reclaimed rubber) | | | | | | | | | |
| Particle diamenter of vulcanized rubber (by Tyler scale) | 5 mesh | ← | ← | ← | ← | ← | ← | 15 mesh | — |
| Method of heating | Microwave | ← | ← | ← | ← | ← | ← | Electric furnace | — |
| Elevated temperature | 320° C. | ← | ← | ← | ← | ← | ← | ← | — |
| Retention time at elevated temperature | 10 minutes | ← | ← | ← | ← | ← | ← | 5 minutes | — |
| Method for cooling | Spontaneous cooling | Spray of water | ← | ← | ← | Injection of liquefied CO$_2$ | Indirect cooling with water | Injection of liquefied CO$_2$ | — |
| Cooling speed (°C./min.) | 5 | 70 | 20 | 70 | 20 | 20 | 20 | ← | — |
| Temperature after cooling | Room temperature | 180 | 175 | 98 | 110 | 196 | 197 | 174 | — |
| (Formulation of reclaimed rubber) | | | | | | | | | |
| New rubber composition (parts) | 300 | ← | ← | ← | ← | ← | ← | ← | ← |
| Reclaimed rubber (parts) | 60 | ← | ← | ← | ← | ← | ← | ← | — |
| Accelerator DM (parts) | 2 | ← | ← | ← | ← | ← | ← | ← | — |
| Sulfur (parts) | 15 | ← | ← | ← | ← | ← | ← | ← | — |
| (Physical properties of vulcanized rubber) | | | | | | | | | |
| Hardness (Hs, JIS C) | 58 | 72 | 71 | 72 | 71 | 70 | 72 | 72 | 73 |
| Tensile strength (kg/cm$^2$) | 110.8 | 120.7 | 117.4 | 124.0 | 118.0 | 115.2 | 119.3 | 118.0 | 130.0 |
| Elongation (%) | 574 | 517 | 493 | 483 | 503 | 498 | 516 | 493 | 487 |

TABLE 1-continued

| | Comparative Experiment | Example 1 | Example 2 | Example 3 | Example 4 | Example 5 | Example 6 | Example 7 | New rubber |
|---|---|---|---|---|---|---|---|---|---|
| Compression set (%) | 48.1 | 38.9 | 41.7 | 38.7 | 41.4 | 42.1 | 38.8 | 40.2 | 38.0 |

Remarks "Parts" are meant as parts by weight.

What is claimed is:

1. A method for the reclamation of vulcanized rubber by application of heat, which method is characterized by heating powdered vulcanized rubber to a temperature for desulfurization of said vulcanized rubber and, on completion of said desulfurization, quickly cooling said desulfurized rubber to a temperature of about 100° to 200° C. at which substantially no oxidation of said desulfurized rubber proceeds, wherein the step of cooling occurs at least at a rate of 10° C./min effected by means of the addition of water to said desulfurized rubber, wherein the amount of water to be added to said desulfurized rubber is limited to a level at which the added water causes no change in the weight of desulfurized rubber.

2. A method for the reclamation of vulcanized rubber according to claim 1, wherein said heating of vulcanized rubber is effected by means of microwave.

3. The method as in claim 1 wherein the cooling temperature range is about 150° C. to about 200° C.